(12) United States Patent
Suzuki et al.

(10) Patent No.: US 11,424,455 B2
(45) Date of Patent: Aug. 23, 2022

(54) LITHIUM SECONDARY BATTERY AND CARD WITH BUILT-IN BATTERY

(71) Applicant: NGK INSULATORS, LTD., Nagoya (JP)

(72) Inventors: Chiori Suzuki, Nagoya (JP); Yuki Fujita, Nagoya (JP); Haruo Otsuka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 250 days.

(21) Appl. No.: 16/900,023

(22) Filed: Jun. 12, 2020

(65) Prior Publication Data

US 2020/0313195 A1    Oct. 1, 2020

Related U.S. Application Data

(63) Continuation of application No. PCT/JP2019/007462, filed on Feb. 27, 2019.

(30) Foreign Application Priority Data

Mar. 28, 2018 (JP) .............................. JP2018-063173

(51) Int. Cl.
*H01M 4/66* (2006.01)
*H01M 4/131* (2010.01)
(Continued)

(52) U.S. Cl.
CPC ........... *H01M 4/661* (2013.01); *H01M 4/131* (2013.01); *H01M 10/0525* (2013.01);
(Continued)

(58) Field of Classification Search
None
See application file for complete search history.

(56) References Cited

U.S. PATENT DOCUMENTS

| 9,379,375 B2 | 6/2016 | Sugiura et al. |
| 10,454,109 B2 | 10/2019 | Ohira et al. |

(Continued)

FOREIGN PATENT DOCUMENTS

| JP | 2000-149997 A1 | 5/2000 |
| JP | 2006-004816 A1 | 1/2006 |

(Continued)

OTHER PUBLICATIONS

English translation of the Written Opinion (Application No. PCT/JP2019/007462) dated May 28, 2019.

(Continued)

*Primary Examiner* — Wyatt P McConnell
(74) *Attorney, Agent, or Firm* — Burr & Brown, PLLC

(57) ABSTRACT

Provided is a lithium secondary battery including: a positive electrode plate being a lithium complex oxide sintered plate; a negative electrode layer; a separator; a positive electrode current collector foil; a negative electrode current collector foil; an electrolytic solution; a pair of exterior films having outer peripheral edges sealed with each other to form an internal space that accommodates the battery elements; a positive electrode tab terminal; and a negative electrode tab terminal, wherein the inner peripheral edge of the sealed part of the exterior films and the outer peripheral edge of the positive electrode plate are apart from each other at a distance $W_p$ of 2.0 to 4.0 mm on the side on which the positive electrode tab terminal is sealed, and the electrolytic solution has a volume of 1.05 to 1.25 times the total void volume of the positive electrode plate, the separator, and the negative electrode layer.

12 Claims, 7 Drawing Sheets

(51) Int. Cl.
  H01M 10/0525 (2010.01)
  H01M 50/46 (2021.01)
  H01M 4/02 (2006.01)

(52) U.S. Cl.
  CPC ...... H01M 50/46 (2021.01); *H01M 2004/021* (2013.01); *H01M 2004/027* (2013.01); *H01M 2004/028* (2013.01)

(56) References Cited

U.S. PATENT DOCUMENTS 10,629,905 B2    4/2020   Yura et al.
2018/0233745 A1*  8/2018   Yura ................ H01M 4/131

FOREIGN PATENT DOCUMENTS

| JP | 2006-331838 | A1 | 12/2006 |
| JP | 2012-054003 | A1 | 3/2012 |
| JP | 5587052 | B2 | 9/2014 |
| JP | 2017-079192 | A1 | 4/2017 |
| WO | 2017/146088 | A1 | 8/2017 |
| WO | 2017/188232 | A1 | 11/2017 |

OTHER PUBLICATIONS

International Search Report and Written Opinion (Application No. PCT/JP2019/007462) dated May 28, 2019 (with English translation).

* cited by examiner

LITHIUM SECONDARY BATTERY AND CARD WITH BUILT-IN BATTERY

CROSS-REFERENCE TO RELATED APPLICATIONS

This application is a continuation application of PCT/JP2019/007462 filed Feb. 27, 2019, which claims priority to Japanese Patent Application No. 2018-063173 filed Mar. 28, 2018, the entire contents all of which are incorporated herein by reference.

BACKGROUND OF THE INVENTION

1. Field of the Invention

The present invention relates to a lithium secondary battery and a card with built-in battery.

2. Description of the Related Art

In recent years, smart cards with built-in battery are being put into practical use. Examples of smart cards with built-in primary battery include credit cards with one-time password display function. Examples of smart cards with built-in secondary battery include cards with fingerprint authentication and wireless communication functions provided with wireless communication IC, ASIC for fingerprint analysis, and a fingerprint sensor. Such batteries for smart cards are generally required to have properties such as a thickness of less than 0.45 mm, a high capacity and a low resistance, a bending resistance, and a thermal resistance to withstand the processing temperature.

Secondary batteries or cards with secondary battery for such applications have been proposed. For example, Patent Literature 1 (JP2017-79192A) discloses a secondary battery to be built in a plate member such as a card and having a sufficient strength even in the case where the plate member is bent and deformed. The secondary battery includes an electrode assembly including a positive electrode and a negative electrode, a sheet-like laminate film-covered body the outer peripheral side of which is welded while covering the electrode assembly, and a positive electrode connection terminal and a negative electrode connection terminal with one end side connected to the electrode assembly and the other end side extending outward from the laminate film-covered body. Further, Patent Literature 2 (JP2006-331838A) discloses a thin battery on the surface of which large wrinkles are less likely to occur and which has excellent flexibility. The thin battery includes: a battery body accommodating a separator, a positive electrode layer, and a negative electrode layer between a positive electrode current collector and a negative electrode current collector; and a seal part including a frame member made of resin and hermetically sealing the periphery of the battery body, wherein 100 µm≤D1≤320 µm and D1/D2≤0.85 are satisfied when the thickness of the seal part is referred to as D1, and the maximum thickness of the battery center is referred to as D2. In the secondary batteries disclosed in Patent Literatures 1 and 2 above, powder-dispersed positive electrodes produced by applying a positive electrode mixture containing a positive electrode active material, a conductive agent, a binder, and the like, followed by drying, are employed.

Meanwhile, such powder-dispersed positive electrodes generally contain a relatively large amount (e.g., about 10% by weight) of components (binders and conductive agents) that do not contribute to the capacity of battery, resulting in a low packing density of the positive electrode active material, i.e., lithium complex oxide. Accordingly, the powder-dispersed positive electrode should be greatly improved from the viewpoint of the capacity and charge/discharge efficiency. Some attempts have been made to improve the capacity and charge/discharge efficiency by positive electrodes or layers of positive electrode active material composed of lithium complex oxide sintered plate. In this case, since the positive electrode or the layer of positive electrode active material contains no binder or conductive agent, high capacity and satisfactory charge/discharge efficiency can be expected due to a high packing density of lithium complex oxide. For example, Patent Literature 3 (JP5587052B) discloses a positive electrode including a positive electrode current collector and a positive electrode active material layer connected to the positive electrode current collector with a conductive bonding layer therebetween. The positive electrode active material layer is composed of a lithium complex oxide sintered plate, and the sintered plate has a thickness of 30 µm or more, a porosity of 3 to 30%, and an open pore rate of 70% or more. Further, Patent Literature 4 (WO2017/146088) discloses use of an oriented sintered plate including a plurality of primary grains composed of lithium complex oxide such as lithium cobaltate ($LiCoO_2$), the plurality of primary grains being oriented at an average orientation angle of over 0° and 30° or less to the plate face in the positive electrode plate, as a positive electrode of a lithium secondary battery including a solid electrolyte.

CITATION LIST

Patent Literature

Patent Literature 1: JP2017-79192A
Patent Literature 2: JP2006-331838A
Patent Literature 3: JP5587052B
Patent Literature 4: WO2017/146088

SUMMARY OF THE INVENTION

However, such cards with built-in film-covered battery including a lithium complex oxide sintered plate (positive electrode plate), as disclosed in Patent Literatures 3 and 4, have a problem that wrinkles are likely to occur on the card surface in the vicinity of the side on which a positive electrode tab terminal is present when a repeated bending test over hundreds of times required by JIS (Japanese Industrial Standards) is performed.

The inventors have now found that, in a lithium secondary battery in the form of a film-covered battery including a positive electrode sintered plate, wrinkles are less likely to occur in the vicinity of the positive electrode tab terminal even if bending is repeated, when the distance between the inner peripheral edge of the sealed part of the exterior films and the outer peripheral edge of the positive electrode plate, and the amount of the electrolytic solution satisfy predetermined conditions. In particular, they have found that wrinkles are less likely to occur in the vicinity of the positive electrode tab terminal even in the case where a film-covered lithium secondary battery in the form of a card with built-in battery that satisfies the aforementioned conditions is subjected to a repeated bending test over hundreds of times required in JIS.

Accordingly, an object of the present invention is to provide a lithium secondary battery in film-covered form which includes a lithium complex oxide sintered plate as a positive electrode plate and in which wrinkles are less likely to occur in the vicinity of the end of the positive electrode plate even if bending is repeated (particularly in the form of a card with built-in battery).

According to an aspect of the present invention, there is provided a lithium secondary battery comprising:
- a positive electrode plate which is a lithium complex oxide sintered plate;
- a negative electrode layer which has a size larger than the size of the positive electrode plate and contains carbon;
- a separator which is interposed between the positive electrode plate and the negative electrode layer and has a size larger than the sizes of the positive electrode plate and the negative electrode layer;
- a positive electrode current collector foil bonded to a surface of the positive electrode plate on the side away from the separator;
- a negative electrode current collector foil bonded to a surface of the negative electrode layer on the side away from the separator;
- an electrolytic solution with which the positive electrode plate, the negative electrode layer, and the separator are impregnated;
- a pair of exterior films having outer peripheral edges sealed with each other to form an internal space, the internal space accommodating the positive electrode plate, the positive electrode current collector foil, the negative electrode layer, the negative electrode current collector foil, the separator, and the electrolytic solution;
- a positive electrode tab terminal connected to the positive electrode current collector foil and extending outwardly from the sealed part of the pair of exterior films; and
- a negative electrode tab terminal connected to the negative electrode current collector foil and extending outwardly from the sealed part of the pair of exterior films,
- wherein the separator has an outer peripheral portion in close contact with at least the outer peripheral edge of the exterior film on the positive electrode plate side or a peripheral region in the vicinity thereof, so as to separate a compartment accommodating the positive electrode plate and a compartment accommodating the negative electrode layer from each other,
- wherein the positive electrode tab terminal and the negative electrode tab terminal extend from different positions on a common side or different sides in the sealed part of the exterior films from each other,
- wherein the inner peripheral edge of the sealed part of the exterior films and the outer peripheral edge of the positive electrode plate are apart from each other at a distance $W_p$ of 2.0 to 4.0 mm on the side on which the positive electrode tab terminal is sealed, and
- wherein the electrolytic solution has a volume of 1.05 to 1.25 times the total void volume of the positive electrode plate, the separator, and the negative electrode layer.

According to another aspect of the present invention, there is provided a card with built-in battery, comprising: a resin substrate; and the lithium secondary battery embedded within the resin substrate.

BRIEF DESCRIPTION OF THE DRAWINGS

FIG. 2B includes an image of a film-covered battery at the right end.

DETAILED DESCRIPTION OF THE INVENTION

Lithium Secondary Battery

Figure 1:
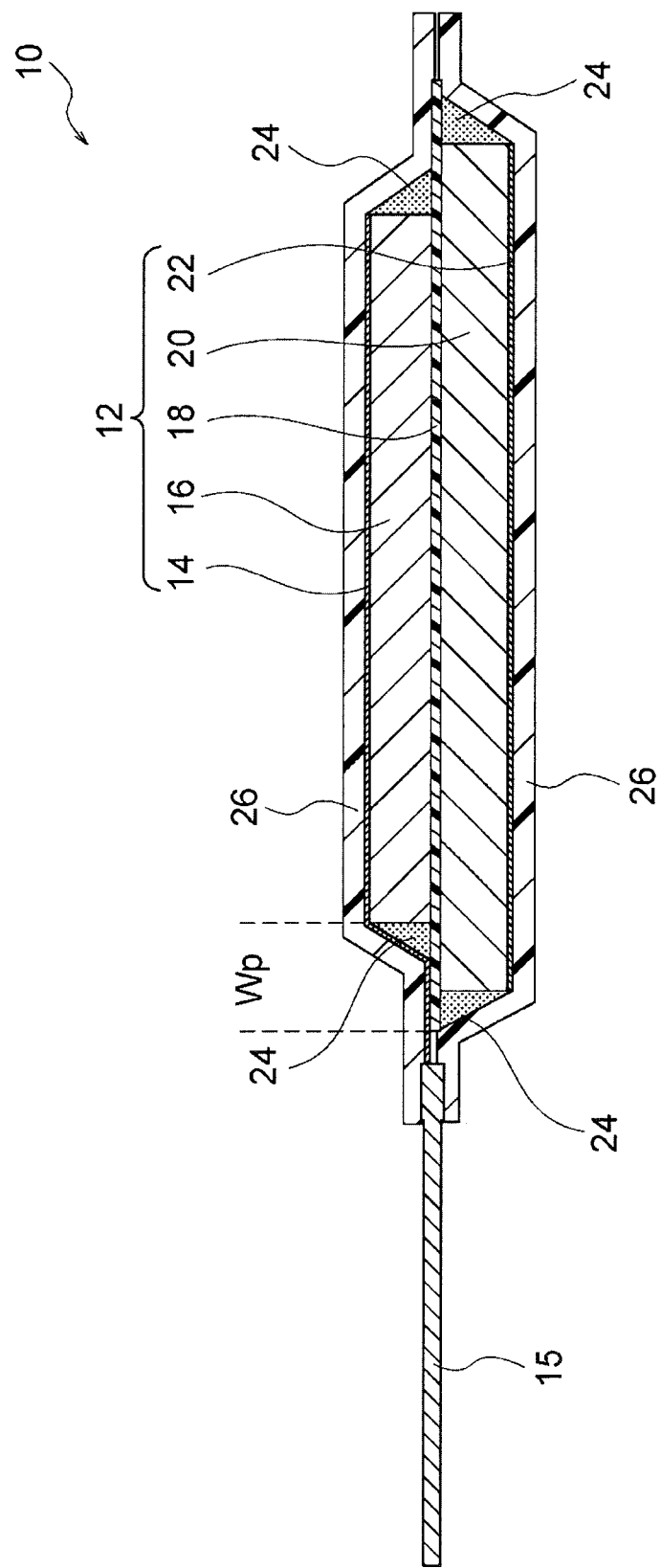
FIG. 1 is a schematic sectional view of an example of a lithium secondary battery of the present invention.

FIG. 1 schematically shows an example of a lithium secondary battery of the present invention. A lithium secondary battery 10 shown in FIG. 1 includes a positive electrode plate 16, a separator 18, a negative electrode layer 20, a positive electrode current collector foil 14, a negative electrode current collector foil 22, an electrolytic solution 24, a positive electrode tab terminal 15, a negative electrode tab terminal (not shown), and a pair of exterior films 26. The positive electrode plate 16 is a lithium complex oxide sintered plate. The negative electrode layer 20 contains carbon and has a size larger than the size of the positive electrode plate 16. The separator 18 is interposed between the positive electrode plate 16 and the negative electrode layer 20 and has a size larger than the sizes of the positive electrode plate 16 and the negative electrode layer 20. The positive electrode current collector foil 14 is bonded to a surface of the positive electrode plate 16 on the side away from the separator 18, and the negative electrode current collector foil 22 is bonded to a surface of the negative electrode layer on the side away from the separator 18. The positive electrode plate 16, the negative electrode layer 20, and the separator 18 are impregnated with the electrolytic solution 24. The pair of exterior films 26 have outer peripheral edges sealed with each other to form an internal space, and the internal space accommodates the positive electrode plate 16, the positive electrode current collector foil 14, the negative electrode layer 20, the negative electrode current collector foil 22, the separator 18, and the electrolytic solution 24. The separator 18 has an outer peripheral portion in close contact with at least the outer peripheral edge of the exterior film 26 on the positive electrode plate 16 side or a peripheral region in the vicinity thereof, to separate a compartment accommodating the positive electrode plate 16 and a compartment accommodating the negative electrode layer 20 from each other. The positive electrode tab terminal 15 is connected to the positive electrode current collector foil 14 and extends outwardly from the sealed part of the pair of exterior films 26. Meanwhile, the negative electrode tab terminal is connected to the negative electrode current collector foil 22 and extends outwardly from the sealed part of the pair of exterior films 26. Further, the positive electrode tab terminal 15 and the negative electrode tab terminal extend from different positions on a common side or different sides in the sealed part of the exterior films 26 from each other (in the latter case, inevitably different positions). FIG. 1 does not show the negative electrode tab terminal (and connection to the negative electrode current collector foil 22). This is because the negative electrode tab terminal is present at a hidden and invisible position on the back side of the positive electrode tab terminal 15 in the direction perpendicular to the paper surface (see the negative electrode tab terminal 23 shown in FIG. 2A). Then, the inner peripheral edge of the sealed part of the exterior films 26 and the outer peripheral edge of the positive electrode plate 16 are apart from each other at a distance $W_p$ of 2.0 to 4.0 mm on the side on which the positive electrode tab terminal 15 is sealed. Further, the volume of the electrolytic solution 24 is 1.05 to 1.25 times the total void volume of the positive electrode plate 16, the separator 18, and the negative electrode layer 20. In this way, in the lithium secondary battery 10 in the form of a film-covered battery including a positive electrode sintered plate, wrinkles are less likely to occur in the vicinity of the positive electrode tab terminal 15 even if bending is repeated when the distance between the inner peripheral edge of the sealed part of the exterior films 26 and the outer peripheral edge of the positive electrode plate 16, and the amount of the electrolytic solution 24 satisfy predetermined conditions. In particular, wrinkles are less likely to occur in the vicinity of the positive electrode tab terminal 15, even in the case where the film-covered lithium secondary battery 10 in the form of a card with built-in battery that satisfies the aforementioned conditions is subjected to a repeated bending test over hundreds of times required in JIS.

That is, the cards with built-in film-covered battery including a lithium complex oxide sintered plate (positive electrode plate) as disclosed in Patent Literatures 3 and 4 have a problem that wrinkles are likely to occur on the card surface in the vicinity of the side on which the positive electrode tab terminal is present in the case where a repeated bending test over hundreds of times required in JIS is performed, as described above. In this regard, the lithium secondary battery of the present invention can effectively reduce such wrinkles. The reason for this is not clear, but it is presumed to be as follows. That is, it is considered that an excess space where the electrolytic solution remains tends to occur near the side where the positive electrode tab terminal is present with employment of the positive electrode sintered plate, and the excess space mainly causes wrinkles, but such an excess space or an excess electrolytic solution remaining therein can be conveniently reduced (to the extent that the internal resistance is not excessively increased) to effectively suppress the occurrence of wrinkles by satisfying the aforementioned conditions of the present invention. Accordingly, the lithium secondary battery 10 of the present invention is preferably a thin secondary battery capable to be built in a card, more preferably a thin secondary battery for being embedded in a resin substrate to form a card. That is, another preferable aspect of the present invention provides a card with built-in battery including a resin substrate and a lithium secondary battery embedded in the resin substrate. The card with built-in battery typically includes a pair of resin films and a lithium secondary battery interposed between the pair of resin films, and the resin films are preferably thermally fused with each other by hot-pressing.

The lithium secondary battery 10 preferably has low internal resistance. In particular, in the lithium secondary battery 10 of the present invention, the amount of the electrolytic solution 24 satisfying the predetermined conditions contributes to ensuring low internal resistance as desired. For example, the lithium secondary battery 10 preferably has a resistance at 1 Hz, as determined by the AC impedance method, of less than 25 $\Omega \cdot cm^2$, more preferably less than 21 $\Omega \cdot cm^2$, further preferably less than 18 $\Omega \cdot cm^2$. The lower limit of the resistance at 1 Hz is not specifically limited but is typically 12 $\Omega \cdot cm^2$ or more.

The positive electrode plate 16 is a lithium complex oxide sintered plate. The fact that the positive electrode plate 16 is a sintered plate means that the positive electrode plate 16 contains no binder. This is because, even if a binder is contained in a green sheet, the binder disappears or burns out during firing. Then, since the positive electrode plate 16 contains no binder, there is an advantage that deterioration of the positive electrode due to the electrolytic solution 24 can be avoided. The lithium complex oxide constituting the sintered plate is particularly preferably lithium cobaltate (typically, $LiCoO_2$ (which will be hereinafter abbreviated as LCO)). Various lithium complex oxide sintered plates or LCO sintered plates are known, and those disclosed in Patent Literature 3 (JP5587052B) and Patent Literature 4 (WO2017/146088) can be used, for example.

Figure 3:
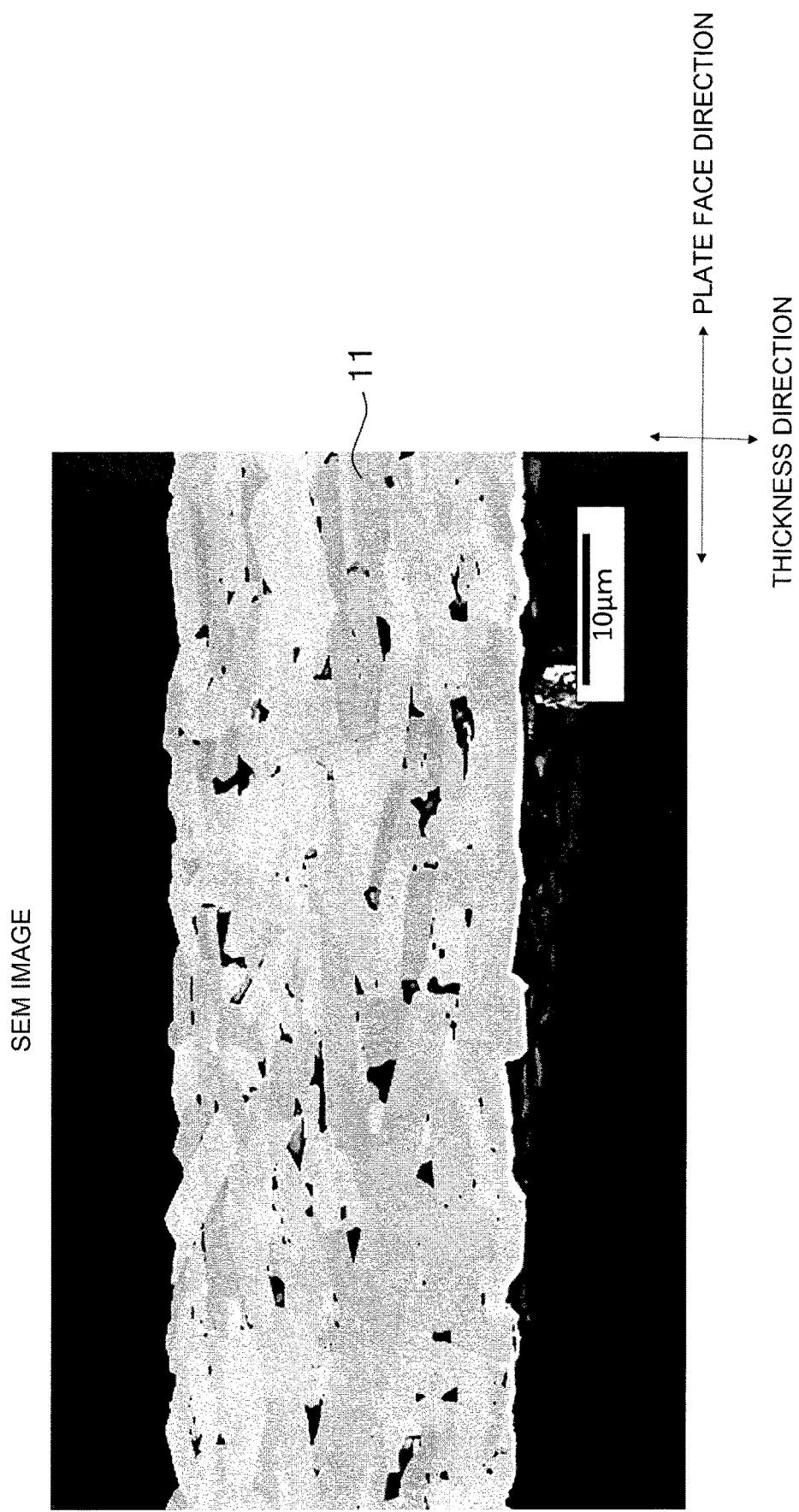
FIG. 3 is a SEM image showing an example of a cross section perpendicular to the plate face of an oriented positive electrode plate.
Figure 4:
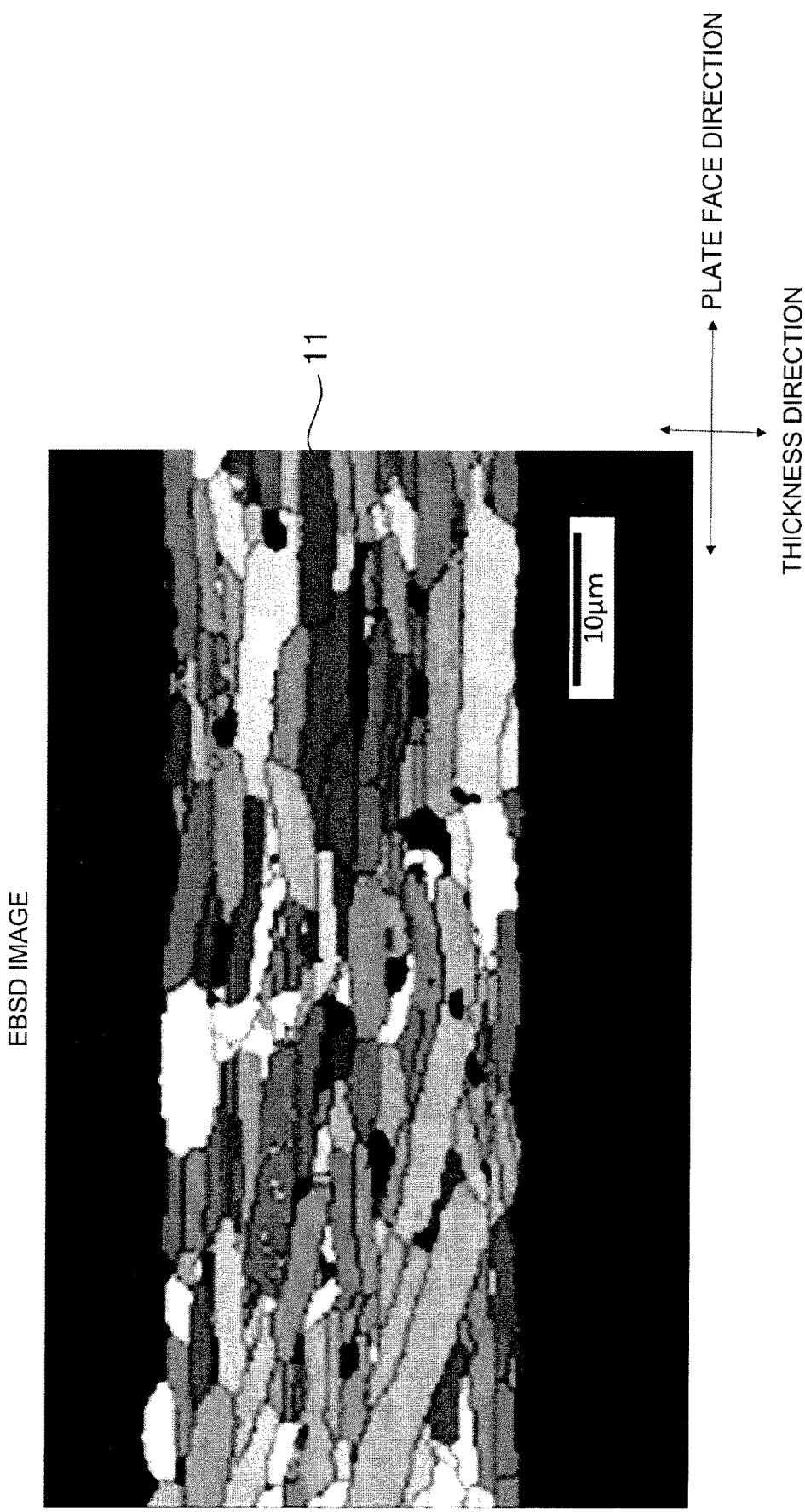
FIG. 4 is an EBSD image in the cross section of the oriented positive electrode plate shown in FIG. 3.
Figure 5:
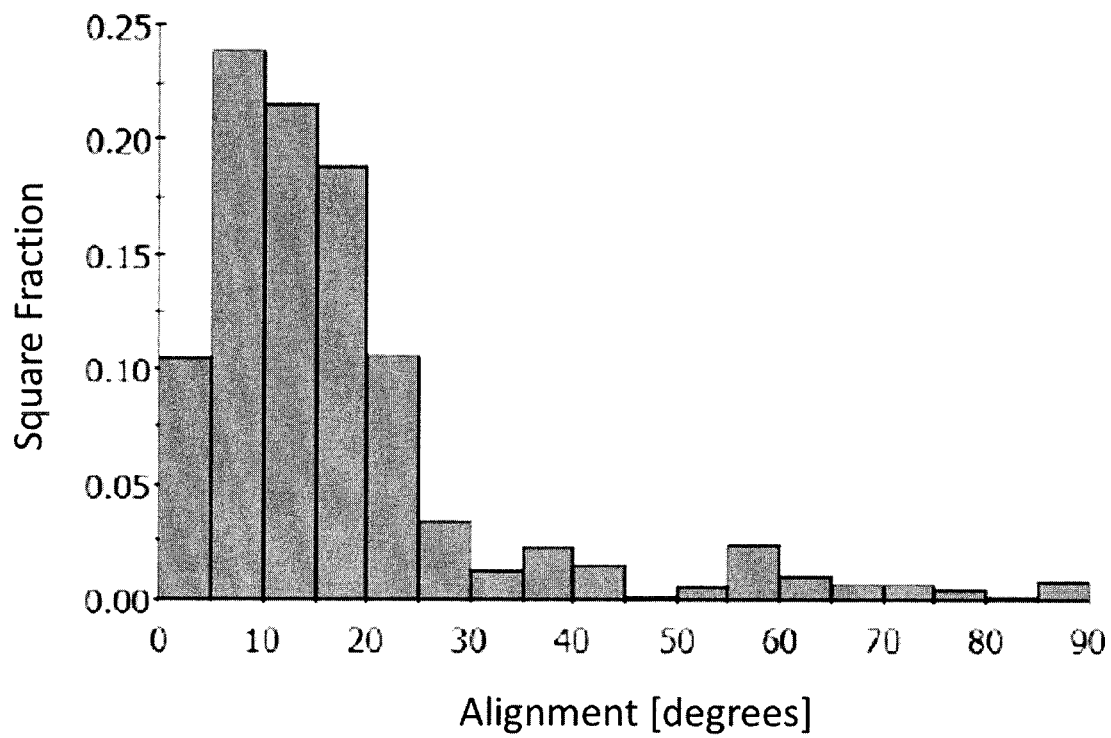
FIG. 5 is an area-based histogram showing the distribution of orientation angles of primary grains in the EBSD image shown in FIG. 4.

According to a preferable aspect of the present invention, the positive electrode plate 16, that is, the lithium complex oxide sintered plate is an oriented positive electrode plate including a plurality of primary grains composed of lithium complex oxide, the plurality of primary grains being oriented at an average orientation angle of over 0° and 30° or less to the plate face of the positive electrode plate. FIG. 3 shows an example of a SEM image in a cross section perpendicular to the plate face of the oriented positive electrode plate 16, and FIG. 4 shows an electron backscatter diffraction (EBSD: Electron Backscatter Diffraction) image in a cross section perpendicular to the plate face of the oriented positive electrode plate 16. Further, FIG. 5 shows an area-based histogram showing the distribution of orientation angles of primary grains 11 in the EBSD image shown in FIG. 4. In the EBSD image shown in FIG. 4, the discontinuity of crystal orientation can be observed. In FIG. 4, the orientation angle of each primary grain 11 is indicated by the shading of color. A darker color indicates a smaller orientation angle. The orientation angle is a tilt angle formed by plane (003) of the primary grains 11 to the plate face direction. In FIGS. 3 and 4, the points shown in black within the oriented positive electrode plate 16 represent pores.

The oriented positive electrode plate 16 is an oriented sintered body composed of the plurality of primary grains 11 bound to each other. The primary grains 11 are each mainly in the form of a plate but may include rectangular, cubic, and spherical grains. The cross-sectional shape of each primary grain 11 is not particularly limited and may be a rectangular shape, a polygonal shape other than the rectangular shape, a circular shape, an elliptical shape, or a complex shape other than above.

The primary grains 11 are composed of a lithium complex oxide. The lithium complex oxide is an oxide represented by $Li_xMO_2$ (where $0.05<x<1.10$ is satisfied, M represents at least one transition metal, and M typically contains one or more of Co, Ni, and Mn). The lithium complex oxide has a layered rock-salt structure. The layered rock-salt structure refers to a crystalline structure in which lithium layers and transition metal layers other than lithium are alternately stacked with oxygen layers interposed therebetween, that is, a crystalline structure in which transition metal ion layers and single lithium layers are alternately stacked with oxide ions therebetween (typically, an $\alpha$-$NaFeO_2$ structure, i.e., a cubic rock-salt structure in which transition metal and lithium are regularly disposed in the [111] axis direction). Examples of the lithium complex oxide include $Li_xCoO_2$ (lithium cobaltate), $Li_xNiO_2$ (lithium nickelate), $Li_xMnO_2$ (lithium manganate), $Li_xNiMnO_2$ (lithium nickel manganate), $Li_xNiCoO_2$ (lithium nickel cobaltate), $Li_xCoNiMnO_2$ (lithium cobalt nickel manganate), and $Li_xCoMnO_2$ (lithium cobalt manganate), particularly preferably $Li_xCoO_2$ (lithium cobaltate, typically $LiCoO_2$). The lithium complex oxide may contain one or more elements selected from Mg, Al, Si, Ca, Ti, V, Cr, Fe, Cu, Zn, Ga, Ge, Sr, Y, Zr, Nb, Mo, Ag, Sn, Sb, Te, Ba, Bi, and W.

As shown in FIGS. 4 and 5, the average of the orientation angles of the primary grains 11, that is, the average orientation angle is over 0° and 30° or less. This brings various advantages as follows. First, since each primary grain 11 lies in a direction inclined from the thickness direction, the adhesion between the primary grains can be improved. As a result, the lithium ion conductivity between a certain primary grain 11 and each of other primary grains 11 adjacent to the primary grain 11 on both sides in the longitudinal direction can be improved, so that the rate characteristic can be improved. Secondly, the rate characteristic can be further improved. This is because, when lithium ions move in and out, the oriented positive electrode plate 16 expands and contracts smoothly since the oriented positive electrode plate 16 expands and contracts more in the thickness direction than in the plate face direction, as described above, and thus the lithium ions also move in and out smoothly.

The average orientation angle of the primary grains 11 is obtained by the following method. First, three horizontal lines that divide the oriented positive electrode plate 16 into four equal parts in the thickness direction and three vertical lines that divide the oriented positive electrode plate 16 into four equal parts in the plate face direction are drawn in an EBSD image of a rectangular region of 95 μm×125 μm observed at a magnification of 1000 times, as shown in FIG. 4. Next, the average orientation angle of the primary grains 11 is obtained by arithmetically averaging the orientation angles of all the primary grains 11 intersecting at least one of the three horizontal lines and the three vertical lines. The average orientation angle of the primary grains 11 is preferably 30° or less, more preferably 25° or less, from the viewpoint of further improving the rate characteristics. From the viewpoint of further improving the rate characteristics, the average orientation angle of the primary grains 11 is preferably 2° or more, more preferably 5° or more.

As shown in FIG. 5, the orientation angles of the primary grains 11 may be widely distributed from 0° to 90°, but most of them are preferably distributed in the region of over 0° and 30° or less. That is, when a cross section of the oriented sintered body constituting the oriented positive electrode plate 16 is analyzed by EBSD, the total area of the primary grains 11 with an orientation angle of over 0° and 30° or less to the plate face of the oriented positive electrode plate 16 (which will be hereinafter referred to as low-angle primary grains) out of the primary grains 11 contained in the cross section analyzed is preferably 70% or more, more preferably 80% or more, with respect to the total area of the primary grains 11 contained in the cross section (specifically, 30 primary grains 11 used for calculating the average orientation angle). Thereby, the proportion of the primary grains 11 with high mutual adhesion can be increased, so that the rate characteristic can be further improved. Further, the total area of grains with an orientation angle of 20° or less among the low-angle primary grains is more preferably 50% or more with respect to the total area of 30 primary grains 11 used for calculating the average orientation angle. Further, the total area of grains with an orientation angle of 10° or less among the low-angle primary grains is more preferably 15% or more with respect to the total area of 30 primary grains 11 used for calculating the average orientation angle.

Since the primary grains 11 are each mainly in the form of a plate, the cross section of each primary grain 11 extends in a predetermined direction, typically in a substantially rectangular shape, as shown in FIGS. 3 and 4. That is, when the cross section of the oriented sintered body is analyzed by EBSD, the total area of the primary grains 11 with an aspect ratio of 4 or more in the primary grains 11 contained in the cross section analyzed is preferably 70% or more, more preferably 80% or more, with respect to the total area of the primary grains 11 contained in the cross section (specifically, 30 primary grains 11 used for calculating the average orientation angle). Specifically, in the EBSD image as shown in FIG. 4, the mutual adhesion between the primary grains 11 can be further improved by above, as a result of which the rate characteristic can be further improved. The aspect ratio of each primary grain 11 is a value obtained by dividing the maximum Feret diameter of the primary grain 11 by the minimum Feret diameter. The maximum Feret diameter is the maximum distance between two parallel straight lines that interpose the primary grain 11 therebetween on the EBSD image in observation of the cross section. The minimum Feret diameter is the minimum distance between two parallel straight lines that interpose the primary grain 11 therebetween on the EBSD image.

The mean diameter of the plurality of primary grains constituting the oriented sintered body is preferably 5 μm or more. Specifically, the mean diameter of the 30 primary grains 11 used for calculating the average orientation angle is preferably 5 μm or more, more preferably 7 μm or more, further preferably 12 μm or more. Thereby, since the number of grain boundaries between the primary grains 11 in the direction in which lithium ions conduct is reduced, and the lithium ion conductivity as a whole is improved, the rate characteristic can be further improved. The mean diameter of the primary grains 11 is a value obtained by arithmetically averaging the equivalent circle diameters of the primary grains 11. An equivalent circle diameter is the diameter of a circle having the same area as each primary grain 11 on the EBSD image.

The denseness of the oriented sintered body constituting the oriented positive electrode plate 16 is preferably 70% or more, more preferably 80% or more, further preferably 90% or more. In other words, the oriented sintered body constituting the oriented positive electrode plate 16 preferably has a porosity of 30% or less, more preferably 20% or less, further preferably 10% or less. Thereby, the mutual adhesion between the primary grains 11 can be further improved, so that the rate characteristic can be further improved. The denseness of the oriented sintered body is calculated by polishing a cross section of the positive electrode plate with CP (cross-section polisher) polishing, thereafter observing the cross section at a magnification of 1000 times with SEM, and binarizing the SEM image obtained. The average equivalent circle diameter of pores formed inside the oriented sintered body is not particularly limited but is preferably 8 μm or less. The smaller the average equivalent circle diameter of the pores, the mutual adhesion between the primary grains 11 can be improved more. As a result, the rate characteristic can be improved more. The average equivalent circle diameter of the pores is a value obtained by arithmetically averaging the equivalent circle diameters of 10 pores on the EBSD image. An equivalent circle diameter is the diameter of a circle having the same area as each pore on the EBSD image. The pores formed inside the oriented sintered body may be open pores connected to the outside of the oriented positive electrode plate 16 but preferably do not pass through the oriented positive electrode plate 16. The pores may be closed pores.

The thickness of the positive electrode plate 16 is not specifically limited but is preferably 70 to 120 μm, more preferably 80 to 100 further preferably 80 to 95 μm, particularly preferably 85 to 95 The thickness within such a range can suppress the deterioration of the battery characteristics (particularly, the increase of the resistance value) due to repeated charging/discharging and further contribute to reducing the wrinkles due to repeated bending, while improving the energy density of the lithium secondary battery 10 by increasing the capacity of the active material per unit area. Further, the size of the positive electrode plate 16 is preferably 5 mm×5 mm square or more, more preferably 10 mm×10 mm to 200 mm×200 mm square, further preferably 10 mm×10 mm to 100 mm×100 mm square, in other words, preferably 25 $mm^2$ or more, more preferably 100 to 40000 $mm^2$, further preferably 100 to 10000 $mm^2$.

The negative electrode layer 20 contains carbon as a negative electrode active material. Examples of the carbon include graphite, pyrolytic carbon, cokes, resin fired materials, mesophase small spheres, and mesophase pitches, preferably graphite. Graphite may be any of natural graphite and artificial graphite. The negative electrode layer 20 preferably further contains a binder. Examples of the binder include styrene butadiene rubber (SBR), polyvinylidene fluoride (PVDF), and polytetrafluoroethylene (PTFE), preferably styrene butadiene rubber (SBR) or polyvinylidene fluoride (PVDF). In particular, in the case of using γ-butyrolactone (GBL) having excellent heat resistance as the electrolytic solution 24, use of styrene butadiene rubber (SBR) as the binder is more preferable since it is less likely to be dissolved in GBL, and deterioration of binder functions due to heating can be avoided.

The thickness of the negative electrode layer 20 is not specifically limited but is preferably 70 to 160 μm, more preferably 80 to 150 μm, further preferably 90 to 140 μm, particularly preferably 100 to 130 μm. The thickness within such a range can contribute also to reducing the wrinkles in the vicinity of the positive electrode tab terminal 15 due to repeated bending while improving the energy density of the lithium secondary battery 10 by increasing the capacity of the active material per unit area.

As the separator 18, separators made of polyolefin, polyimide, polyester (e.g., polyethylene terephthalate (PET)), or cellulose are preferable, and separators made of polyolefin having one side coated with ceramic may be used. Examples of the polyolefin include polypropylene (PP), polyethylene (PE), and combination of these. From the viewpoint of being inexpensive, separators made of polyolefin or cellulose are preferable. Meanwhile, from the viewpoint of being excellent in heat resistance, separators made of polyimide, polyester (e.g., polyethylene terephthalate (PET)), or cellulose are preferable. As being different from widely used separators made of polyolefin with poor heat resistance, separators made of polyimide or cellulose themselves have not only excellent heat resistance, but also the component of the electrolytic liquid, γ-butyrolactone (GBL), having excellent heat resistance exhibits excellent wettability thereon. Accordingly, in the case of using an electrolytic solution containing GBL, the electrolytic solution can sufficiently penetrate into the separator (without repelling). Separators made of polyimide are particularly preferable from the viewpoint of the heat resistance. Separators made of polyimide are commercially available and have an advantage of being capable of preventing or delaying the extension of lithium dendrite that deposits during overcharge and the resulting short circuit more effectively by having an extremely complicated microstructure.

The electrolytic solution 24 is not specifically limited, and commercially available electrolytic solutions for lithium batteries such as a solution obtained by dissolving a lithium salt (e.g., $LiPF_6$) in an organic solvent (e.g., a mixed solvent of ethylene carbonate (EC) and methylethyl carbonate (MEC), a mixed solvent of ethylene carbonate (EC) and diethyl carbonate (DEC), or a mixed solvent of ethylene carbonate (EC) and ethyl methyl carbonate (EMC)) may be used.

In the case of forming a lithium secondary battery having excellent heat resistance, the electrolytic solution 24 preferably contains lithium borofluoride ($LiBF_4$) in a non-aqueous solvent. In this case, the non-aqueous solvent may be a single solvent composed of γ-butyrolactone (GBL) or may be a mixed solvent composed of γ-butyrolactone (GBL) and ethylene carbonate (EC). The non-aqueous solvent has an increased boiling point by containing γ-butyrolactone (GBL), which considerably improves the heat resistance. From such a viewpoint, the volume ratio of EC:GBL in the non-aqueous solvent is preferably 0:1 to 1:1 (GBL ratio: 50 to 100% by volume), more preferably 0:1 to 1:1.5 (GBL ratio: 60 to 100% by volume), further preferably 0:1 to 1:2 (GBL ratio: 66.6 to 100% by volume), particularly preferably 0:1 to 1:3 (GBL ratio: 75 to 100% by volume). The lithium borofluoride ($LiBF_4$) to be dissolved in the non-aqueous solvent is an electrolyte having a high decomposition temperature, which also considerably improves the heat resistance. The $LiBF_4$ concentration in the electrolytic solution 24 is preferably 0.5 to 2 mol/L, more preferably 0.6 to 1.9 mol/L, further preferably 0.7 to 1.7 mol/L, particularly preferably 0.8 to 1.5 mol/L.

The electrolytic solution 24 preferably further contains vinylene carbonate (VC) and/or fluoroethylene carbonate (FEC) and/or vinyl ethylene carbonate (VEC) as additives. Both VC and FEC have excellent heat resistance. Accordingly, a SEI film having excellent heat resistance can be formed on the surface of the negative electrode layer 20 by the electrolytic solution 24 containing such additives.

The positive electrode current collector foil 14 is bonded to a surface of the positive electrode plate 16 on the side away from the separator 18, and the negative electrode current collector foil 22 is bonded to a surface of the negative electrode layer on the side away from the separator 18. Accordingly, the positive electrode current collector foil 14 is interposed between the positive electrode plate 16 and the exterior film 26, and the negative electrode current collector foil 22 is interposed between the negative electrode layer 20 and the exterior film 26. Preferably, the positive electrode current collector foil 14 is bonded to one of the exterior films 26, and the negative electrode current collector foil 22 is bonded to the other of the exterior films 26. The positive electrode current collector foil 14 and the negative electrode current collector foil 22 are not specifically limited but are preferably metal foils such as copper foils and aluminum foils.

The positive electrode tab terminal 15 is connected to the positive electrode current collector foil 14 and extends outwardly from the sealed part of the pair of exterior films 26. Meanwhile, the negative electrode tab terminal 23 is connected to the negative electrode current collector foil 22 and extends outwardly from the sealed part of the pair of exterior films 26. More specifically, the positive electrode tab terminal 15 and the negative electrode tab terminal 23 extend from different positions on a common side or different sides in the sealed part of the exterior films 26 from each other. The positive electrode tab terminal 15 and the negative electrode tab terminal 23 are not specifically limited, but the positive electrode current collector foil 14 and the negative electrode current collector foil 22 can be made of the same or different materials, preferably metal foils such as copper foils and aluminum foils. Further, the connection between the positive electrode tab terminal 15 and the positive electrode current collector foil 14, and the connection between the negative electrode tab terminal 23 and the negative electrode current collector foil 22 are not specifically limited and may be performed using a known connection method such as welding and an adhesive. Alternatively, the positive electrode tab terminal 15 and the positive electrode current collector foil 14 or the negative electrode tab terminal 23 and the negative electrode current collector foil 22 may be an integrated product made of the same material.

The thickness of the lithium secondary battery 10 is preferably 350 to 500 μm, more preferably 380 to 450 μm, further preferably 400 to 430 μm. The thickness within such a range can make a thin lithium battery suitable for being built in a thin device such as a smart card and contribute also to reducing the wrinkles in the vicinity of the positive electrode tab terminal 15 due to repeated bending.

The outer peripheral edges of the pair of exterior films 26 are sealed with each other to form an internal space, and the internal space accommodates battery elements 12 and the electrolytic solution 24. That is, as shown in FIG. 1, the battery elements 12 that are components of the lithium secondary battery 10 and the electrolytic solution 24 are packaged and sealed by the pair of exterior films 26. As a result, the lithium secondary battery 10 is in the form of a so-called film-covered battery. Here, the battery elements 12 are defined as containing the positive electrode plate 16, the positive electrode current collector foil 14, the separator 18, the negative electrode layer 20, and the negative electrode current collector foil 22. The outer edges of the lithium secondary battery 10 are preferably sealed by the exterior films 26 thermally fused with each other. The sealing by thermal fusion is preferably performed using a heat bar (referred to also as heating bar) generally used for heat sealing applications. The outer peripheral edges of the pair of exterior films 26 are typically in the form of the four sides of the lithium secondary battery 10 and are preferably sealed throughout all the outer peripheral four sides.

Commercially available exterior films may be used as the exterior films 26. The thickness per piece of the exterior films 26 is preferably 50 to 80 μm, more preferably 55 to 75 μm, further preferably 55 to 65 μm. Preferable examples of the exterior film 26 include a laminate film containing a resin film and a metal foil, more preferably an aluminum laminate film containing a resin film and an aluminum foil. The laminate film is preferably provided with resin films on both sides of the metal foil such as an aluminum foil. In this case, it is preferable that the resin film on one side of the metal foil (which will be hereinafter referred to as a surface protective film) be composed of a material with excellent reinforcing properties such as nylon, polyamide, polyethylene terephthalate, polyimide, polytetrafluoroethylene, and polychlorotrifluoroethylene, and the resin film on the other side of the metal foil be composed of a heat sealing material such as polypropylene.

As described above, the negative electrode layer 20 has a size larger than the size of the positive electrode plate 16, whereas the separator 18 has a size larger than the sizes of the positive electrode plate 16 and the negative electrode layer 20. Further, the separator 18 has an outer peripheral portion in close contact with at least the outer peripheral edge of the exterior film 26 on the positive electrode plate 16 side or a peripheral region in the vicinity thereof, to separate a compartment accommodating the positive electrode plate 16 and a compartment accommodating the negative electrode layer 20 from each other. Further, the outer peripheral portion of the separator 18 may be in close contact also with the outer peripheral edge of the exterior film 26 on the negative electrode layer 20 side or a peripheral region in the vicinity thereof.

On the side on which the positive electrode tab terminal 15 is sealed, the inner peripheral edge of the sealed part of the exterior films 26 and the outer peripheral edge of the positive electrode plate 16 are apart from each other at a distance $W_p$ of 2.0 to 4.0 mm, preferably 2.5 to 3.5 mm, more preferably 2.5 to 3.0 mm. Here, the distance $W_p$ between the inner peripheral edge of the sealed part of the exterior films 26 and the outer peripheral edge of the positive electrode plate 16 means the distance from the innermost position where the pair of exterior films 26 are in close contact to the end of the positive electrode plate 16 in the vicinity thereof on the side on which the positive electrode tab terminal 15 is sealed, as shown in FIG. 1.

The volume of the electrolytic solution 24 is 1.05 to 1.25 times, preferably 1.10 to 1.25 times, more preferably 1.10 to 1.20 times, further preferably 1.12 to 1.20 times, particularly preferably 1.12 to 1.18 times the total void volume of the positive electrode plate 16, the separator 18, and the negative electrode layer 20. The volume of the electrolytic solution 24 can be determined by measuring the weight of the lithium secondary battery 10 in advance, then opening the lithium secondary battery 10, followed by vacuum drying (e.g., heating at 120° C. for 12 hours), to measure the weight after drying, and determining the change in weight before and after drying. Then, the ratio (times) of the amount of the electrolytic solution with respect to the total void volume can be calculated by dividing the amount of the electrolytic solution obtained by the total void volume of the positive electrode plate 16, the separator 18, and the negative electrode layer 20. The void volume of each of the positive electrode plate 16, the separator 18, and the negative electrode layer 20 can be calculated by multiplying the external volume (the volume of each member including voids) calculated from the outer dimensions of the member by the porosity of the member. Then, the porosity of each of the positive electrode plate 16, the negative electrode layer 20, and the separator 18 is desirably determined by capturing cross-sectional SEM images (reflection images) of each member in three visual fields that do not overlap one another, adjusting and binarizing the contrast so that the member is distinguished from voids in each visual field to calculate a porosity, and calculating an average calculated from porosities in the three visual fields.

Method for Producing Lithium Cobaltate Oriented Sintered Plate

The oriented positive electrode plate or the oriented sintered plate that is preferably used for the lithium secondary battery of the present invention may be produced by any production method but is preferably produced through (1) production of $LiCoO_2$ template particles, (2) production of matrix particles, (3) production of green sheet, and (4) production of oriented sintered plate, as exemplified below.

(1) Production of LiCoO$_2$ Template Particles

Co$_3$O$_4$ raw material powder is mixed with Li$_2$CO$_3$ raw material powder. The mixed powder obtained is fired at 500 to 900° C. for 1 to 20 hours, to synthesize LiCoO$_2$ powder. The resultant LiCoO$_2$ powder is milled into a volume-based D50 particle diameter of 0.1 to 10 μm with a pot mill to yield platy LiCoO$_2$ particles capable of conducting lithium ions in parallel with the plate surface. The resultant LiCoO$_2$ particles are susceptible to cleavage along a cleavage plane. The LiCoO$_2$ particles are cleaved by crushing, thereby producing LiCoO$_2$ template particles. Such LiCoO$_2$ particles are also produced by a procedure involving grain growth in a green sheet from LiCoO$_2$ powder slurry and crushing the green sheet, or a procedure involving synthesis of platy crystals, such as a flux process, a hydrothermal synthesis process, a single crystal growth process using a melt, and a sol gel process.

In this step, the profile of the primary grains 11 constituting the oriented positive electrode plate 16 can be controlled, as described below:

The proportion of the total area of low-angle primary grains with an orientation angle of over 0° and 30° or less can be controlled by adjusting at least one of the aspect ratio and the particle diameter of the LiCoO$_2$ template particles. Specifically, the proportion of the total area of low-angle primary grains can be increased, as the aspect ratio of the LiCoO$_2$ template particles is increased, and as the particle diameter of the LiCoO$_2$ template particles is increased. The aspect ratio and the particle diameter of the LiCoO$_2$ template particles each can be controlled by adjusting at least one of the particle diameter of the Co$_3$O$_4$ raw material powder and the Li$_2$CO$_3$ raw material powder, the milling conditions (such as the milling time, the milling energy, and the milling procedure) during milling, and classification after milling.

The proportion of the total area of the primary grains 11 with an aspect ratio of 4 or more can be controlled by adjusting the aspect ratio of the LiCoO$_2$ template particles. Specifically, the proportion of the total area of the primary grains 11 with an aspect ratio of 4 or more can be increased, as the aspect ratio of the LiCoO$_2$ template particles is increased. The procedure of adjusting the aspect ratio of the LiCoO$_2$ template particles is as described above.

The mean diameter of the primary grains 11 can be controlled by adjusting the particle diameter of the LiCoO$_2$ template particles.

The denseness of the oriented positive electrode plate 16 can be controlled by adjusting the particle diameter of the LiCoO$_2$ template particles. Specifically, the denseness of the oriented positive electrode plate 16 can be increased, as the particle diameter of the LiCoO$_2$ template particles is reduced.

(2) Production of Matrix Particles

Co$_3$O$_4$ raw material powder is used as the matrix particles. The volume-based D50 particle diameter of the Co$_3$O$_4$ raw material powder may be any value, e.g., 0.1 to 1.0 μm and is preferably smaller than the volume-based D50 particle diameter of LiCoO$_2$ template particles. The matrix particles may also be produced by heating a Co(OH)$_2$ raw material at 500° C. to 800° C. for 1 to 10 hours. In addition to Co$_3$O$_4$, Co(OH)$_2$ particles may be used, or LiCoO$_2$ particles may be used as the matrix particles.

In this step, the profile of the primary grains 11 constituting the oriented positive electrode plate 16 can be controlled, as described below:

The proportion of the total area of low-angle primary grains with an orientation angle of over 0° and 30° or less can be controlled by adjusting the ratio of the particle diameter of the matrix particles with respect to the particle diameter of the LiCoO$_2$ template particles (which will be hereinafter referred to as "particle diameter ratio matrix/template"). Specifically, since the matrix particles are more easily incorporated into the LiCoO$_2$ template particles in the firing step, which will be described below, as the particle diameter ratio matrix/template is reduced, that is, as the particle diameter of the matrix particles decreases. Therefore, the proportion of the total area of low-angle primary grains can be increased.

The proportion of the total area of the primary grains 11 with an aspect ratio of 4 or more can be controlled by adjusting the particle diameter ratio matrix/template. Specifically, the proportion of the total area of the primary grains 11 with an aspect ratio of 4 or more can be increased, as the particle diameter ratio matrix/template is reduced, that is, as the particle diameter of the matrix particles decreases.

The denseness of the oriented positive electrode plate 16 can be controlled by adjusting the particle diameter ratio matrix/template. Specifically, the denseness of the oriented positive electrode plate 16 can be increased, as the particle diameter ratio matrix/template is reduced, that is, as the particle diameter of the matrix particles decreases.

(3) Production of Green Sheet

Mixed powder is obtained by mixing the LiCoO$_2$ template particles with the matrix particles at 100:0 to 3:97. While mixing the mixed powder, a dispersion medium, a binder, a plasticizer, and a dispersant, the mixture is stirred under reduced pressure, defoamed, and adjusted to a desired viscosity, to form a slurry. Next, the slurry prepared is subjected to a forming procedure capable of applying a shear force to the LiCoO$_2$ template particles, thereby forming a green body. Thus, the average orientation angle of the primary grains 11 can be adjusted to over 0° and 30° or less. The forming procedure capable of applying a shear force to the LiCoO$_2$ template particles preferably includes a doctor blade process. In the case of using the doctor blade process, the slurry prepared is cast on a PET film, thereby forming the green body, i.e., a green sheet.

In this step, the profile of the primary grains 11 constituting the oriented positive electrode plate 16 can be controlled, as described below:

The proportion of the total area of low-angle primary grains with an orientation angle of over 0° and 30° or less can be controlled by adjusting the forming speed. Specifically, the proportion of the total area of low-angle primary grains can be increased, as the forming speed is increased.

The mean diameter of the primary grains 11 can be controlled by adjusting the density of the green body. Specifically, the mean diameter of the primary grains 11 can be increased, as the density of the green body is increased.

The denseness of the oriented positive electrode plate 16 can be controlled also by adjusting the mixing ratio of the LiCoO$_2$ template particles and the matrix particles. Specifically, the denseness of the oriented positive electrode plate 16 can be reduced, as the number of the LiCoO$_2$ template particles is increased.

(4) Production of Oriented Sintered Plate

The green body of the slurry is placed on a setter made of zirconia, followed by heating at 500 to 900° C. for 1 to 10 hours (primary firing), to obtain a sintered plate as an intermediate. The sintered plate is placed on a zirconia setter while being vertically interposed between lithium sheets (e.g., $Li_2CO_3$-containing sheets), followed by secondary firing, to obtain a $LiCoO_2$ sintered plate. Specifically, the setter on which the sintered plate interposed between the lithium sheets is placed is put into an alumina sheath, followed by firing in the atmosphere at 700 to 850° C. for 1 to 20 hours. Thereafter, the sintered plate is further vertically interposed between lithium sheets, followed by firing at 750 to 900° C. for 1 to 40 hours, to obtain a $LiCoO_2$ sintered plate. This firing process may be performed in one or two steps. In the case of firing in two separate steps, the temperature in the first firing step is preferably lower than that in the second firing step. The total amount of the lithium sheets used in the secondary firing may be such that the molar ratio Li/Co the amount of Li in the green sheet and the lithium sheets with respect to the amount of Co in the green sheet is 1.0.

In this step, the profile of the primary grains 11 constituting the oriented positive electrode plate 16 can be controlled, as described below:

- The proportion of the total area of low-angle primary grains with an orientation angle of over 0° and 30° or less can be controlled by adjusting the heating rate during firing. Specifically, sintering between the matrix particles is more suppressed, as the heating rate is increased, so that the proportion of the total area of low-angle primary grains can be increased.
- The proportion of the total area of low-angle primary grains with an orientation angle of over 0° and 30° or less can be controlled also by adjusting the temperature to heat the intermediate. Specifically, sintering between the matrix grains is more suppressed, as the temperature to heat the intermediate is reduced, so that the proportion of the total area of low-angle primary grains can be increased.
- The mean diameter of the primary grains 11 can be controlled by adjusting at least one of the heating rate during firing and the temperature to heat the intermediate. Specifically, the mean diameter of the primary grains 11 can be increased, as the heating rate is increased, and as the temperature to heat the intermediate is reduced.
- The mean diameter of the primary grains 11 can be controlled also by adjusting at least one of the amount of Li (e.g., $Li_2CO_3$) and the amount of a sinter aid (e.g., boric acid and bismuth oxide) during firing. Specifically, the mean diameter of the primary grains 11 can be increased, as the amount of Li is increased, and as the amount of the sinter aid is increased.
- The denseness of the oriented positive electrode plate 16 can be controlled by adjusting the profile during firing. Specifically, the denseness of the oriented positive electrode plate 16 can be increased, as the firing temperature is slowed, and as the firing time is increased.

EXAMPLES

The invention will be illustrated in more detail by the following examples.

Examples 1 to 9

(1) Production of Lithium Secondary Battery

Figure 2A:
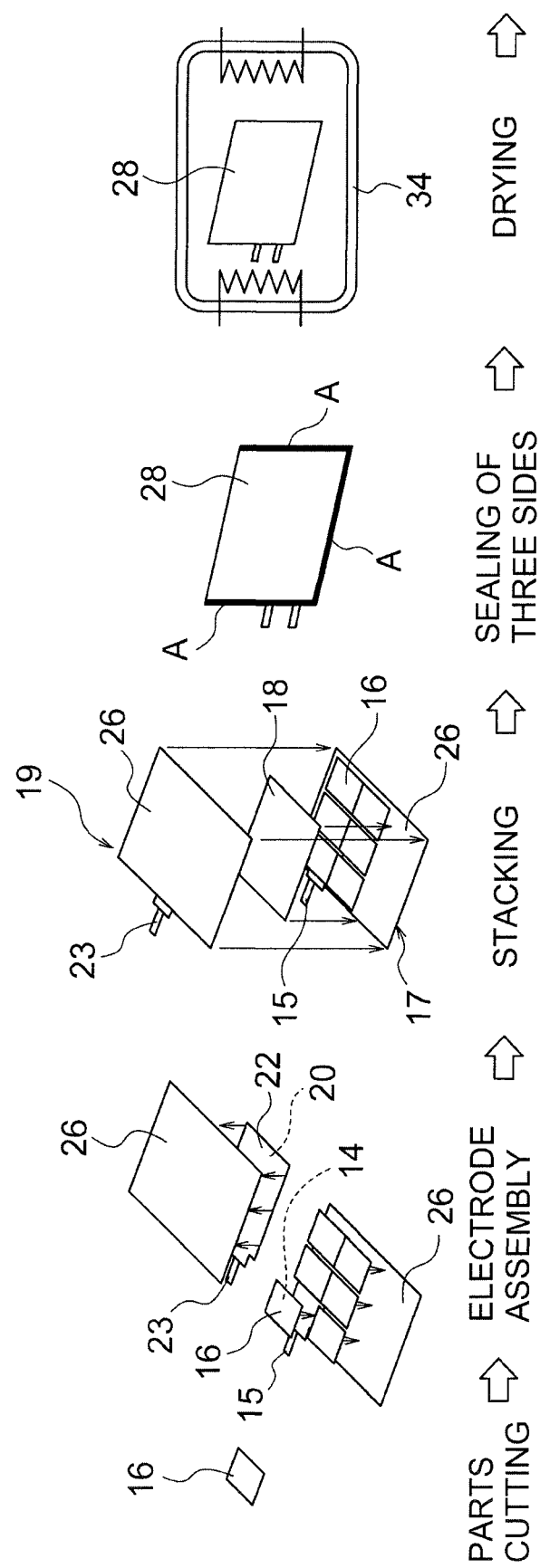
FIG. 2A illustrates an example of the first half of the production process of the lithium secondary battery.
Figure 2B:
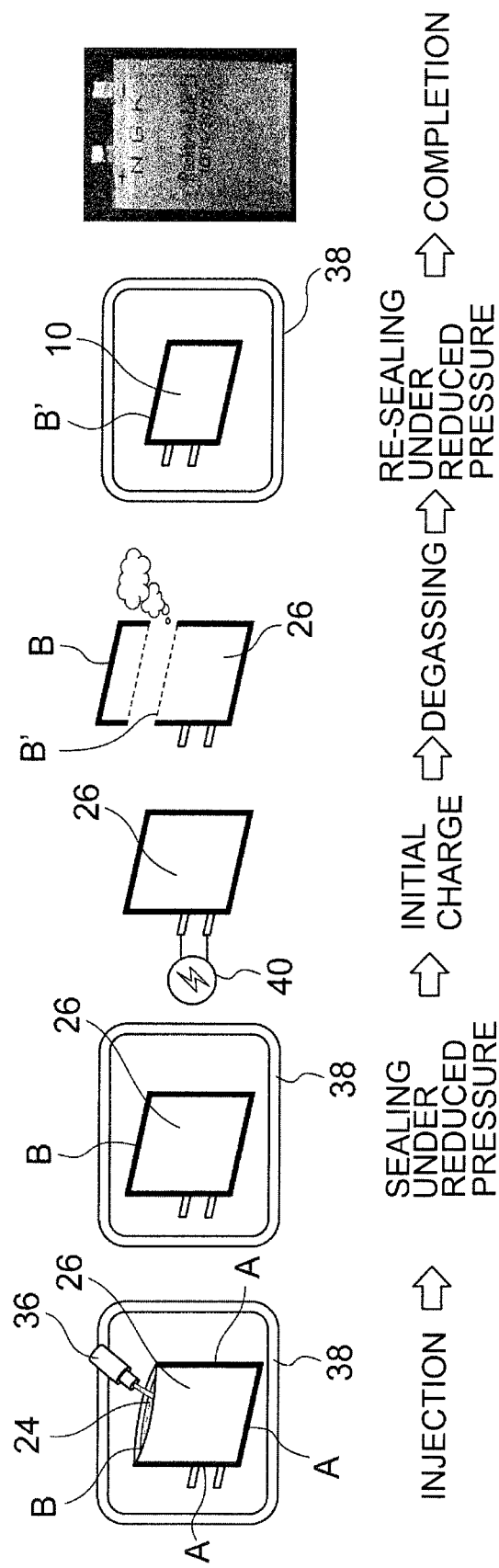
FIG. 2B illustrates an example of the latter half of the production process of the lithium secondary battery, showing steps subsequent to the steps shown in FIG. 2A.

The lithium secondary battery 10 in the form of a film-covered battery as schematically shown in FIG. 1 was produced by procedures as shown in FIGS. 2A and 2B. The lithium secondary battery produced in this example had excellent heat resistance to withstand a high temperature process (e.g., hot lamination) at a high temperature (e.g., 135° C.). Specifically, the procedures were as follows.

First, a $LiCoO_2$ sintered plate (which will be hereinafter referred to as a LCO sintered plate) with a thickness of 90 µm and a porosity of 30% was prepared. The LCO sintered plate was produced according to the aforementioned method for producing a lithium complex oxide sintered plate and satisfied the aforementioned various preferable conditions of the lithium complex oxide sintered plate. The sintered plate was cut into a square of 10.5 mm×9.5 mm with a laser processing machine, to obtain positive electrode plates 16 in the form of a plurality of chips. FIG. 2A shows the positive electrode plates 16 in the form of the plurality of chips, but there is no limitation to this, and the positive electrode plate 16 that is one piece undivided into the form of chips may be used to form a positive electrode assembly 17, which will be described below.

As the exterior films 26, two pieces of aluminum laminate films (with a thickness of 61 µm and a three-layer structure of polypropylene film/aluminum foil/nylon film, manufactured by Showa Denko packaging Co., Ltd.) were prepared. As shown in FIG. 2A, the positive electrode plates 16 in the form of the plurality of chips were stacked on one of the exterior films 26 via the positive electrode current collector foil 14 (an aluminum foil with a thickness of 9 µm), to form the positive electrode assembly 17. At this time, the positive electrode plates 16 in the form of chips were fixed to the positive electrode current collector foil 14 with an adhesive, and the positive electrode current collector foil 14 was fixed to the exterior film 26 with an adhesive. The positive electrode tab terminal 15 was fixed to the positive electrode current collector foil 14 by welding, extending from the positive electrode current collector foil 14. Meanwhile, the negative electrode layer 20 (a carbon layer with a thickness of 130 µm) was stacked on the other of the exterior films 26 via the negative electrode current collector foil 22 (a copper foil with a thickness of 10 µm) to form a negative electrode assembly 19. At this time, the negative electrode layer 20 was fixed to the negative electrode current collector foil 22 with a binder contained therein, and the negative electrode current collector foil 22 was fixed to the exterior film 26 with an adhesive. The negative electrode tab terminal 23 was fixed to the negative electrode current collector foil 22 by welding, extending from the negative electrode current collector foil 22. Further, the carbon layer serving as the negative electrode layer 20 was a coating film containing a mixture of graphite powder as an active material, carboxymethylcellulose (CMC) as a thickener, and styrene butylene rubber (SBR) as a binder at graphite:CMC:SBR=98:1:1 (weight ratio). The negative electrode layer 20 had a density of 1.4 g/cm$^3$ and a weight per unit area of 19 mg/cm$^2$.

As the separator 18, a porous polyimide film (with a thickness of 23 µm and a porosity of 80%, manufactured by TOKYO OHKA KOGYO CO., LTD.) was prepared. As shown in FIG. 2A, the positive electrode assembly 17, the separator 18, and the negative electrode assembly 19 were sequentially stacked so that the positive electrode plate 16 and the negative electrode layer 20 each face the separator 18, to obtain a laminate 28 with both sides covered by the exterior films 26 and the outer peripheral portions of the exterior films 26 protruding from the outer edges of the battery elements 12. The battery elements 12 (the positive electrode current collector foil 14, the positive electrode plate 16, the separator 18, the negative electrode layer 20, and the negative electrode current collector foil 22) thus constructed within the laminate 28 had a quadrangular shape with a size of 2.3 cm×3.2 cm and a thickness of 0.33 mm.

As shown in FIG. 2A, the three sides A of the laminate 28 obtained were sealed. The sealing was performed by hot-pressing the outer peripheral portion of the laminate 28 at 200° C. and 1.5 MPa for 10 seconds using a patch jig (heat bar) adjusted to the sealing width shown in Table 1, to thermally fuse the outer peripheral portions of the exterior films 26 (aluminum laminate films) with each other. After sealing the three sides A, the laminate 28 was put into a vacuum dryer 34, to remove moisture and dry the adhesive.

As shown in FIG. 2B, the side B was temporarily sealed within a glovebox 38 in a reduced-pressure atmosphere with an absolute pressure of 5 kPa using a simple sealer, by inserting an injection device 36 into a gap formed between the pair of exterior films 26 on one remaining side B unsealed of the laminate 28 with the three outer edge sides A sealed, and injecting the electrolytic solution 24 therein. The electrolytic solution used was obtained by dissolving $LiBF_4$ in a mixed solvent containing ethylene carbonate (EC) and γ-butyrolactone (GBL) at 1:3 (volume ratio) to a concentration of 1.5 mol/L and further dissolving vinylene carbonate (VC) therein to a concentration of 5.3% by weight. Thus, the laminate with the side B temporarily sealed was initially charged, followed by aging for 7 days. Finally, the outer peripheral portion of the remaining one side B (the end portion not including the battery elements) was cut off to perform degassing.

As shown in FIG. 2B, the side B' generated by cutting off the temporary sealing was sealed within the glovebox 38 in a reduced-pressure atmosphere with an absolute pressure of 5 kPa. This sealing was also performed by hot-pressing the outer peripheral portion of the laminate 28 at 200° C. and 1.5 MPa for 10 seconds, to thermally fuse the outer peripheral portions of the exterior films 26 (aluminum laminate films) with each other. Thus, the side B' was sealed with the pair of exterior films 26, to form the lithium secondary battery 10 in the form of a film-covered battery. The lithium secondary battery 10 was taken out from the glovebox 38, and excess portions on the outer peripheries of the exterior films 26 were cut off, to adjust the shape of the lithium secondary battery 10. Thus, the lithium secondary battery 10 with the four outer edge sides of the battery elements 12 sealed by the pair of exterior films 26 and with the electrolytic solution 24 injected therein was obtained. The lithium secondary battery 10 obtained had a rectangular shape with a size of 38 mm×27 mm and a thickness of 0.45 mm or less, and a capacity of 30 mAh.

(2) Evaluation

The lithium secondary battery produced was evaluated as follows.

<Measurement of Distance Wp>

Figure 6:
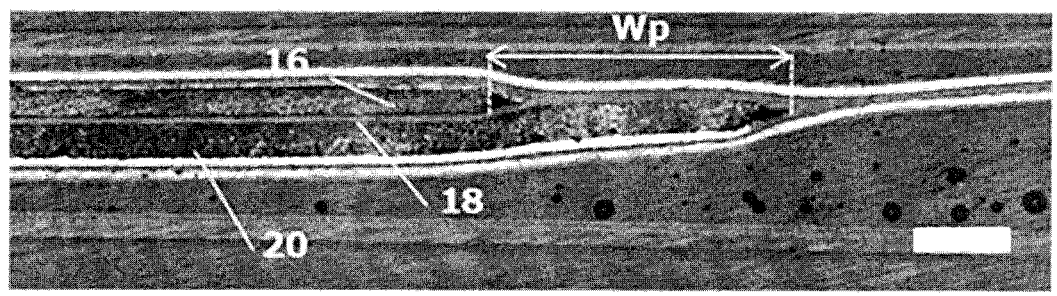
FIG. 6 is a laser microscope image capturing a cross section of a lithium secondary battery produced in Example 1.

A cross section of the lithium secondary battery was captured with a laser microscope, and the distance Wp between the inner peripheral edge of the sealed part of the exterior films 26 and the outer peripheral edge of the positive electrode plate 16 on the side on which the positive electrode tab terminal 15 is sealed was measured. The results were as shown in Table 1. Further, FIG. 6 shows a laser microscope image obtained by capturing a cross section of the lithium secondary battery produced in Example 1.

<Total Void Volume of Positive Electrode Plate, Separator, and Negative Electrode Layer>

The porosity of each of the positive electrode plate 16, the negative electrode layer 20, and the separator 18 was measured by capturing cross-sectional SEM images (reflection images) of each member in three visual fields that do not overlap one another, adjusting and binarizing the contrast so that the member is distinguished from voids in each visual field to calculate a porosity, and calculating an average value calculated from porosities in the three visual fields. Then, the void volume of each member was calculated by multiplying the external volume (the volume of the member including voids) calculated from the outer dimensions of each of the positive electrode plate 16, the separator 18, and the negative electrode layer 20 by the porosity. The total void volume of the positive electrode plate 16, the separator 18, and the negative electrode layer 20 was obtained by summing the void volumes of the members obtained. The results were as shown in Table 1.

<Measurement of Amount of Electrolytic Solution>

The initial weight of the lithium secondary battery was measured. The film-covered battery was opened and dried under vacuum at 120° C. for 12 hours to measure the weight after drying. The amount of the electrolytic solution was calculated from the change in weight before and after drying. Then, the ratio of the amount of the electrolytic solution with respect to the total void volume was calculated by dividing the amount of the electrolytic solution obtained by the total void volume of the positive electrode plate 16, the separator 18, and the negative electrode layer 20. The results were as shown in Table 1.

<Repeated Bending Test>

Figure 7:
FIG. 7 is a schematic diagram of a surface profile illustrating a height H of a protrusion generated on a card surface due to a repeated bending test.

The lithium secondary battery was embedded in an epoxy resin, to produce a card with built-in battery having a rectangular shape with a thickness of 0.76 mm and a size of 86 mm×54 mm. The card with built-in battery was subjected to a bending test according to JIS X 6305-1. Specifically, the card was set in a card holder of a bending tester and subjected to a bending test of 1000 times in total by bending to make the front surface convex in the longitudinal direction 250 times, bending to make the front surface convex in the short direction 250 times, bending to make the back surface convex in the longitudinal direction 250 times, and bending to make the back surface convex in the short direction 250 times: Thereafter, the surface profile of the battery-embedded part in the card was measured using a surface roughness meter (TALYSURF, manufactured by TAYLOR HOBSON). That is, a protrusion was generated on the exterior film around the battery-embedded part of the card by the repeated bending test to some extent, and its height was measured. Specifically, as schematically shown in FIG. 7, a peak corresponding to the protrusion was specified on the surface profile obtained, then a base line BL of the peak was drawn, and the distance in the perpendicular direction from the base line BL to the peak top PT was measured as a height H of the protrusion, to determine the presence or absence of a wrinkle according to the following criteria. The results were as shown in Table 1.

No wrinkle: The height H of the protrusion was less than 40 μm

Wrinkle occurred: The height H of the protrusion was 40 μm or more

<Measurement of 1 Hz Resistance>

Figure 8:
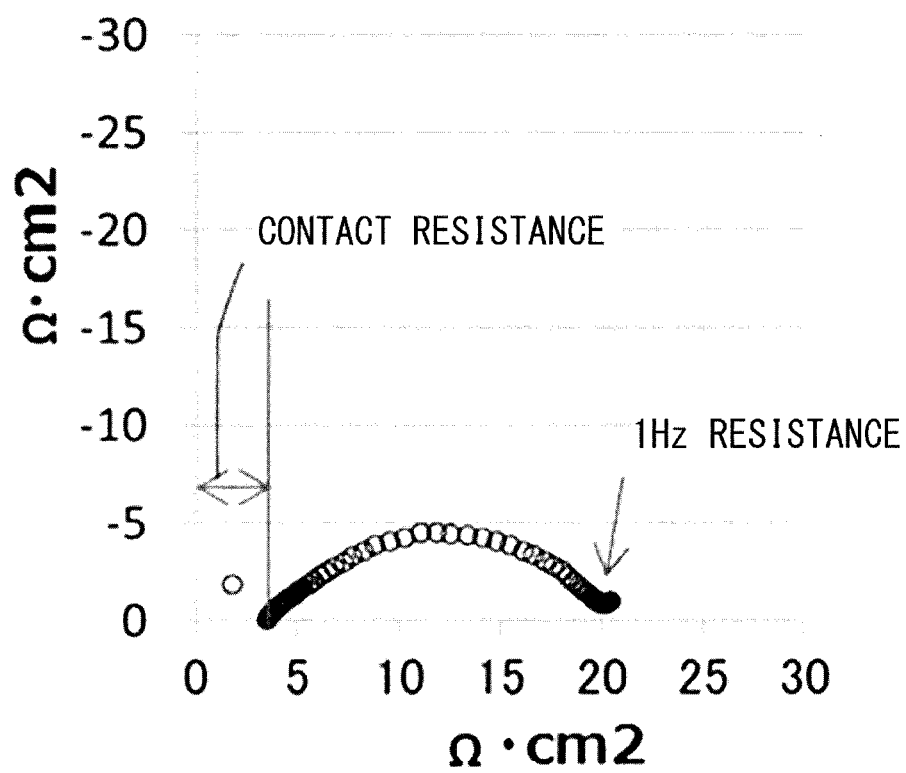
FIG. 8 is a Cole-Cole plot as measured by an AC impedance method at a battery voltage of 3.8 V for the lithium secondary battery produced in Example 1.

The internal resistance of the lithium secondary battery was measured by the AC impedance method at a battery voltage of 3.8 V, and the resistance value ($\Omega \cdot cm^2$) at 1 Hz was read from the Cole-Cole plot obtained. At this time, in the case where the data exactly at 1 Hz could not be measured, a linearly complemented value was used. The contact resistance was set to less than 5 Ω·cm². The results were as shown in Table 1. Further, FIG. 8 shows a Cole-Cole plot as measured by the AC impedance method at a battery voltage of 3.8 V for the film-covered battery produced in Example 1. As shown in Table 1, the resistance value at 1 Hz in Example 9 was 32.9 Ω·cm², which is a higher resistance than in Examples 1 to 8 and therefore means that the battery characteristics are relatively poor.

Examples 10 to 18

A battery was produced and evaluated as in Examples 1 to 9 except that the negative electrode layer (carbon layer), the separator, and the electrolytic solution shown below were used, and various production conditions were set to values shown in Table 1. The lithium secondary battery produced in this example was inferior in heat resistance to the lithium secondary batteries of Examples 1 to 9 but can be produced with lower-cost materials. The results were as shown in Table 2. As shown in Table 2, the resistance at 1 Hz in Example 18 was 29.9 Ω·cm², which is a higher resistance than in Examples 10 to 17 and therefore means that the battery characteristics are relatively poor.

Negative electrode layer (carbon layer): a coating film containing graphite powder as an active material and polyvinylidene fluoride (PVDF) as a binder at graphite: PVDF=90:10 (weight ratio)

Separator: a porous polypropylene film (with a thickness of 25 μm and a porosity of 55%, manufactured by Polypore International, Inc.)

Electrolytic solution: an electrolytic solution obtained by dissolving $LiPF_6$ in a mixed solvent containing ethylene carbonate (EC) and methylethyl carbonate (MEC) at 3:7 (volume ratio) to a concentration of 1.0 mol/L and further dissolving vinylene carbonate (VC) therein to a concentration of 2% by weight

TABLE 1

| | Production conditions | | | | | | Repeated bending test | |
|---|---|---|---|---|---|---|---|---|
| | Sealing width (μm) | Injection volume (ml) | Distance Wp (mm) | Total void volume of positive electrode plate, separator, and negative electrode layer (μL) | Amount of electrolytic solution (μL) | Amount of electrolytic solution (Times) | Resistance at 1 Hz (Ω·cm²) | Hight H of protrusion generated on surface of card (μm) | Presence or absence of wrinkle on surface of card |
| Example 1 | 2.0 | 80 | 3.3 | 63.6 | 75 | 1.18 | 20.9 | 25 | None |
| Example 2 | 3.3 | 80 | 2.0 | 63.6 | 75 | 1.18 | 19.8 | 28 | None |
| Example 3 | 1.3 | 80 | 4.0 | 63.6 | 75 | 1.18 | 21.5 | 35 | None |
| Example 4 | 2.3 | 72 | 3.0 | 63.6 | 67 | 1.05 | 22.1 | 21 | None |
| Example 5 | 2.0 | 84 | 3.3 | 63.6 | 79 | 1.24 | 18.0 | 32 | None |
| Example 6* | 3.5 | 80 | 1.8 | 63.6 | 75 | 1.18 | 19.2 | 48 | Present |
| Example 7* | 1.1 | 80 | 4.2 | 63.6 | 75 | 1.18 | 19.8 | 71 | Present |
| Example 8* | 2.0 | 90 | 3.3 | 63.6 | 85 | 1.34 | 18.6 | 65 | Present |
| Example 9* | 2.1 | 65 | 3.2 | 63.6 | 60 | 0.94 | 32.9 | 20 | None |

Symbol * represents a comparative example.

TABLE 2

| | Production conditions | | | | | | Repeated bending test | |
|---|---|---|---|---|---|---|---|---|
| | Sealing width (μm) | Injection volume (ml) | Distance Wp (mm) | Total void volume of positive electrode plate, separator, and negative electrode layer (μL) | Amount of electrolytic solution (μL) | Amount of electrolytic solution (Times) | Resistance at 1 Hz (Ω·cm²) | Hight H of protrusion generated on surface of card (μm) | Presence or absence of wrinkle on surface of card |
| Example 10 | 2.0 | 100 | 3.3 | 58.3 | 65 | 1.11 | 13.8 | 28 | None |
| Example 11 | 3.3 | 100 | 2.0 | 58.3 | 65 | 1.11 | 13.2 | 30 | None |
| Example 12 | 1.3 | 100 | 4.0 | 58.3 | 65 | 1.11 | 15.0 | 36 | None |

TABLE 2-continued

| | Production conditions | | | | | | Repeated bending test | |
|---|---|---|---|---|---|---|---|---|
| | Sealing width (μm) | Injection volume (ml) | Distance Wp (mm) | Total void volume of positive electrode plate, separator, and negative electrode layer (μL) | Amount of electrolytic solution (μL) | Amount of electrolytic solution (Times) | Resistance at 1 Hz (Ω·cm²) | Hight H of protrusion generated on surface of card (μm) | Presence or absence of wrinkle on surface of card |
| Example 13 | 2.2 | 96 | 3.1 | 58.3 | 61 | 1.05 | 16.2 | 24 | None |
| Example 14 | 1.9 | 108 | 3.4 | 58.3 | 73 | 1.25 | 12.6 | 35 | None |
| Example 15* | 3.6 | 100 | 1.7 | 58.3 | 65 | 1.11 | 13.8 | 52 | Present |
| Example 16* | 1.0 | 100 | 4.3 | 58.3 | 65 | 1.11 | 15.6 | 80 | Present |
| Example 17* | 2.0 | 115 | 3.3 | 58.3 | 80 | 1.37 | 12.6 | 71 | Present |
| Example 18* | 2.1 | 90 | 3.2 | 58.3 | 55 | 0.94 | 29.9 | 22 | None |

Symbol * represents a comparative example.

What is claimed is:

1. A lithium secondary battery comprising:
a positive electrode plate which is a lithium complex oxide sintered plate;
a negative electrode layer which has a size larger than the size of the positive electrode plate and contains carbon;
a separator which is interposed between the positive electrode plate and the negative electrode layer and has a size larger than the sizes of the positive electrode plate and the negative electrode layer;
a positive electrode current collector foil bonded to a surface of the positive electrode plate on the side away from the separator;
a negative electrode current collector foil bonded to a surface of the negative electrode layer on the side away from the separator;
an electrolytic solution with which the positive electrode plate, the negative electrode layer, and the separator are impregnated;
a pair of exterior films having outer peripheral edges sealed with each other to form an internal space, the internal space accommodating the positive electrode plate, the positive electrode current collector foil, the negative electrode layer, the negative electrode current collector foil, the separator, and the electrolytic solution;
a positive electrode tab terminal connected to the positive electrode current collector foil and extending outwardly from the sealed part of the pair of exterior films; and
a negative electrode tab terminal connected to the negative electrode current collector foil and extending outwardly from the sealed part of the pair of exterior films,
wherein the separator has an outer peripheral portion in close contact with at least the outer peripheral edge of the exterior film on the positive electrode plate side or a peripheral region in the vicinity thereof, so as to separate a compartment accommodating the positive electrode plate and a compartment accommodating the negative electrode layer from each other,
wherein the positive electrode tab terminal and the negative electrode tab terminal extend from different positions on a common side or different sides in the sealed part of the exterior films from each other,
wherein the inner peripheral edge of the sealed part of the exterior films and the outer peripheral edge of the positive electrode plate are apart from each other at a distance $W_p$ of 2.0 to 4.0 mm on the side on which the positive electrode tab terminal is sealed, and
wherein the electrolytic solution has a volume of 1.05 to 1.25 times the total void volume of the positive electrode plate, the separator, and the negative electrode layer.

2. The lithium secondary battery according to claim 1, which is a thin secondary battery capable to be built in a card.

3. The lithium secondary battery according to claim 1, wherein the positive electrode current collector foil is bonded to one of the exterior films, and, the negative electrode current collector foil is bonded to the other of the exterior films.

4. The lithium secondary battery according to claim 1, having a resistance at 1 Hz, as determined by an AC impedance method, of less than 25 Ω·cm².

5. The lithium secondary battery according to claim 1, having a thickness of 350 to 500 μm.

6. The lithium secondary battery according to claim 1, wherein the positive electrode plate has a thickness of 70 to 120 μm.

7. The lithium secondary battery according to claim 1, wherein the exterior films have a thickness per piece of 50 to 80 μm.

8. The lithium secondary battery according to claim 1, wherein the exterior films each are a laminate film containing a resin film and a metal foil.

9. The lithium secondary battery according to claim 1, wherein the separator is made of polyolefin, polyolefin having one side coated with ceramic, cellulose, or polyimide.

10. The lithium secondary battery according to claim 1, wherein the lithium complex oxide is lithium cobaltate.

11. The lithium secondary battery according to claim 1, wherein the lithium complex oxide sintered plate is an oriented positive electrode plate containing a plurality of primary grains composed of the lithium complex oxide, the plurality of primary grains being oriented at an average orientation angle of over 0° and 30° or less with respect to the plate face of the positive electrode plate.

12. A card with built-in battery, comprising:
a resin substrate; and
the lithium secondary battery according to claim 1, the lithium secondary battery being embedded within the resin substrate.

* * * * *